(12) United States Patent
Gopalakrishnan

(10) Patent No.: US 8,725,754 B2
(45) Date of Patent: May 13, 2014

(54) METHOD AND SYSTEM FOR MODELING DATA

(76) Inventor: Sridhar Gopalakrishnan, Bangalore (IN)

( * ) Notice: Subject to any disclaimer, the term of this patent is extended or adjusted under 35 U.S.C. 154(b) by 25 days.

(21) Appl. No.: 13/457,490

(22) Filed: Apr. 27, 2012

(65) Prior Publication Data

US 2013/0117316 A1 May 9, 2013

(30) Foreign Application Priority Data

May 16, 2011 (IN) .......................... 1666/CHE/2011

(51) Int. Cl.
*G06F 17/30* (2006.01)

(52) U.S. Cl.
USPC ............ 707/764; 707/999.009; 707/E17.014; 707/790

(58) Field of Classification Search
USPC .......... 707/790, 999, 764, E17.014, 723, 726, 707/722, 739; 726/6
See application file for complete search history.

(56) References Cited

U.S. PATENT DOCUMENTS

| | | | | |
|---|---|---|---|---|
| 5,745,751 A * | 4/1998 | Nelson et al. | ................. | 707/790 |
| 6,314,420 B1 * | 11/2001 | Lang et al. | ............................. | 1/1 |
| 7,873,595 B2 * | 1/2011 | Singh et al. | .................... | 707/603 |
| 8,224,843 B2 * | 7/2012 | Stephens, Jr. | ................. | 707/769 |
| 8,280,754 B2 * | 10/2012 | Chowdhary et al. | ......... | 705/7.11 |
| 8,285,660 B2 * | 10/2012 | Coldicott et al. | ............... | 706/45 |
| 2003/0093415 A1 * | 5/2003 | Larson et al. | ..................... | 707/3 |
| 2004/0003005 A1 * | 1/2004 | Chaudhuri et al. | ........... | 707/200 |
| 2005/0193020 A1 * | 9/2005 | Shkedi | ........................ | 707/104.1 |
| 2007/0128899 A1 * | 6/2007 | Mayer | ............................. | 439/152 |
| 2008/0177994 A1 * | 7/2008 | Mayer | ................................. | 713/2 |
| 2008/0195439 A1 * | 8/2008 | Fidlow et al. | ..................... | 705/7 |
| 2009/0070322 A1 * | 3/2009 | Salvetti et al. | .................... | 707/5 |
| 2009/0217149 A1 * | 8/2009 | Kamien et al. | ................ | 715/230 |
| 2009/0276724 A1 * | 11/2009 | Rosenthal et al. | ............ | 715/771 |
| 2010/0040227 A1 * | 2/2010 | Stephens, Jr. | ................... | 380/30 |
| 2010/0299324 A1 * | 11/2010 | Truve et al. | .................... | 707/725 |
| 2011/0055373 A1 * | 3/2011 | Bnayahu et al. | .............. | 709/224 |
| 2011/0252025 A1 * | 10/2011 | Jin et al. | ........................ | 707/725 |
| 2011/0320019 A1 * | 12/2011 | Lanciani et al. | ................ | 700/92 |
| 2012/0191620 A1 * | 7/2012 | Codina | .......................... | 705/319 |
| 2012/0278244 A1 * | 11/2012 | Lee et al. | ...................... | 705/310 |
| 2012/0290487 A1 * | 11/2012 | Lee et al. | ...................... | 705/310 |
| 2012/0290571 A1 * | 11/2012 | Lee et al. | ...................... | 707/728 |
| 2013/0031067 A1 * | 1/2013 | Iyer et al. | ...................... | 707/703 |
| 2013/0117316 A1 * | 5/2013 | Gopalakrishnan | ............ | 707/790 |

* cited by examiner

*Primary Examiner* — Anteneh Girma
(74) *Attorney, Agent, or Firm* — Barry Choobin; Patent360 LLC

(57) ABSTRACT

The various embodiments herein provide a method and system for modeling a data. The method for modeling data comprises steps of extracting the data from a plurality of data sources, identifying a plurality of entities from the plurality of data, defining occurrence of a relationship between the plurality of entities, capturing recurrences of the relationship between the plurality of entities based on one or more common interactions between the plurality of entities and creating a data model indicating the occurrences and recurrences of the relationship between the plurality of the entities. The data model is adapted to store data corresponding to the plurality of entities, the relationship between the plurality of entities and the common interactions between the plurality of entities. The plurality of entities includes contents of a digital data artifact.

13 Claims, 2 Drawing Sheets

METHOD AND SYSTEM FOR MODELING DATA

CROSS REFERENCE TO RELATED APPLICATIONS

This application claims the benefit of Indian Provisional Application No. 1666/CHE/2011, filed on May 16, 2011, which is incorporated herein by reference.

BACKGROUND

1. Technical Field

The embodiment herein generally relates to data management systems and methods and particularly relates to data optimization. The embodiment herein more particularly relates to a system and method for modeling relevant data by identifying relationship between various entities.

2. Description of the Related Art

The key challenge in managing data today is to help users to locate relevant actionable information quickly and easily. Current methods of information storage and retrieval require users to sift through many data sources before arriving at a solution.

Another aspect of the data management challenge is the proliferation of data sources. Even in regulated environments like a corporation, the number of digital data sources has increased over the past two decades. Various attributes of the same information is generally present in different forms in different data sources. For example, information about a customer will be present as billing details in the finance database, as proposals and project documents in document management systems and conversations/updates on emails, chat, enterprise wikis and blogs and the like. The current methods for managing data do not provide the user a comprehensive view of the activity on a piece of information and also do not derive any actionable insights from the information.

In the existing techniques, integrating data from any two systems requires a custom-made middleware, as it is impossible for the system to understand the content of the participating databases well enough to perform the required integration automatically. The use of a shared ontology to enable semantic interoperability of existing databases and other software is gaining acceptance. It is possible to enable communications between two systems by mapping the semantics of independently developed components to concepts in ontology. The term ontology refers to a conceptual model describing the things in an application domain encoded in a formal, mathematical language.

There exists a technique in which, a web of data referred as semantic web that can be processed by machines. This technique requires that in a given set of data, all uniquely identifiable entities be understood, all relationships between entities be identified and described as ontology and then data be captured in the RDF (Resource Description Framework) format before semantically rich information retrieval is possible.

However, the above explained approach requires significant pre-processing of data before it is ready for semantic information retrieval. Identifying URIs and describing ontology for even a well-defined environment is extremely tedious and expensive. Also creating a generic semantic web incorporating all the digital data in the world is impossible with this approach. Further, creating semantic webs for well-defined and specialized domains such as pharmaceuticals or law is a time-consuming, expensive and effort-intensive activity.

Besides the obvious lack of scalability, cost effectiveness and versatility, the current approach to semantic information management suffers from the need for perpetual high maintenance. Since the RDF method requires a top-down predeterminate ontology, any changes in data or addition of new data with hitherto undefined relationships, need to be captured manually thus adding to the cost of maintaining the semantic web.

Hence there is a need to provide a data management method and system for modeling data by enhancing information relevancy. There is also a need for a data management system to provide highly contextual information sources to a user. Further there exists a need for data management system and method which involves minimal cost and less maintenance.

The abovementioned shortcomings, disadvantages and problems are addressed herein and which will be understood by reading and studying the following specification.

OBJECTS OF THE EMBODIMENTS

The primary object of the embodiments herein is to provide a method and system for creating a data model for modeling relationship between various data objects across a plurality of data sources.

Another object of the embodiments herein is to provide a data model in which data is linked to one another based on identical entities based on common interaction between different entities.

Another object of the embodiments herein is to provide a data modeling method and system which effectively model relationship between entities and facilitate customization of the data model.

Another object of the embodiments herein is to provide a data modeling method and system for providing highly contextual information sources to the user.

Another object of the embodiments herein is to provide a data modeling method and system to update the data sources in response to detecting a change or modification in the context information.

Another object of the embodiments herein is to provide a data modeling method and system to update the data sources in response to detecting a change or modification in the operation history associated with an entity.

Another object of the embodiments herein is to provide a data modeling method and system which allows designing of semantic applications on a single platform.

Yet another object of the embodiments herein is to provide a data modeling method and system which is versatile, scalable, easy to deploy and inexpensive.

These and other objects and advantages of the present invention will become readily apparent from the following detailed description taken in conjunction with the accompanying drawings.

SUMMARY

The various embodiments herein provide a method and system for modeling data. The method for modeling data comprising steps of extracting the data from a plurality of data sources, identifying a plurality of entities from the plurality of data sources, defining occurrence of a relationship between the plurality of entities, capturing recurrences of the relationship between the plurality of entities based on one or more common interactions between the plurality of entities and creating a data model indicating the occurrences and recurrences of the relationship between the plurality of the entities. The data model is adapted to store data corresponding to the plurality of entities, the relationship between the plurality of entities and the common interactions between the plurality of entities.

According to an embodiment herein, the method for modeling the data further comprising updating the data model automatically in response to a modification in a context information or an operation history which is associated with at least one of the plurality of entities.

According to an embodiment herein, the method for modeling data further comprising qualifying the occurrence of the relationship between the pluralities of entities based on a time frame.

According to an embodiment herein, the method for modeling data further comprising defining one or more entities associated with the plurality of entities based on independent existence of the data across the plurality of entities.

According to an embodiment herein, each of the plurality of the entities is connected to other entity by a relationship.

According to an embodiment herein, capturing the recurrence of the relationship comprises steps of identifying the data based on a history of one or more interactions between the plurality of entities, detecting one or more entities which are commonly found with respect to recurrence of relationship and ascertaining the relevancy of the data by evaluating multiple occurrence of the relationship between the plurality of entities.

According to an embodiment herein, the plurality of data sources comprises at least one of emails, wikis, blogs, document management systems, database management systems, data warehouses and a plurality of public domain data sources. The data sources further include structured data sources such as databases, semi-structured data sources and unstructured data sources such as emails.

According to an embodiment herein, the plurality of entities includes parts of a digital data artifact such as documents, reference of elements, names of people, place and the like.

According to an embodiment herein, the plurality of entities is of a type including at least one of a known entity and a derived entity.

According to an embodiment herein, the strength of the plurality of entities is determined based on an identification of a credibility of the data sources.

Embodiments herein further disclose a system for modeling a data. The system comprises a data extractor module to extract the data from a plurality of data sources, an entity extractor to define a plurality of entities, a relationship identifier to identify occurrence of a relationship between the plurality of entities and to evaluate recurrences of the relationship between the plurality of the entities and a data model generator for creating a data model. The data model stores a data corresponding to the plurality of entities, occurrence of the relationship between the plurality of entities and recurrences of the relationships between the plurality of entities based on one or more common interactions between the plurality of entities.

According to an embodiment herein, the system for modeling a data further comprise a datastore implemented using one or more data structures; wherein then data structures are adapted to interact with each other for optimization of the data.

According to an embodiment herein, a relationship identifier is adapted to evolve the relationships between the plurality of entities based on at least one a strength, a context and a frequency of the common interactions between the plurality of entities over a time frame.

According to an embodiment herein, the entity extractor is adapted to automatically extract a document metadata from a plurality of text structured, semi-structured and unstructured text documents and extract a structured information from a plurality of unstructured machine readable documents and semi-structured machine readable documents.

According to an embodiment herein, the relationship identifier includes one or more machine learning algorithms, inference engines and semantic aggregators to evaluate occurrence and recurrences of relationships between the plurality of the entities.

According to an embodiment herein, the data model is adapted to be programmed through an application programming interface to employ a user defined data logic.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
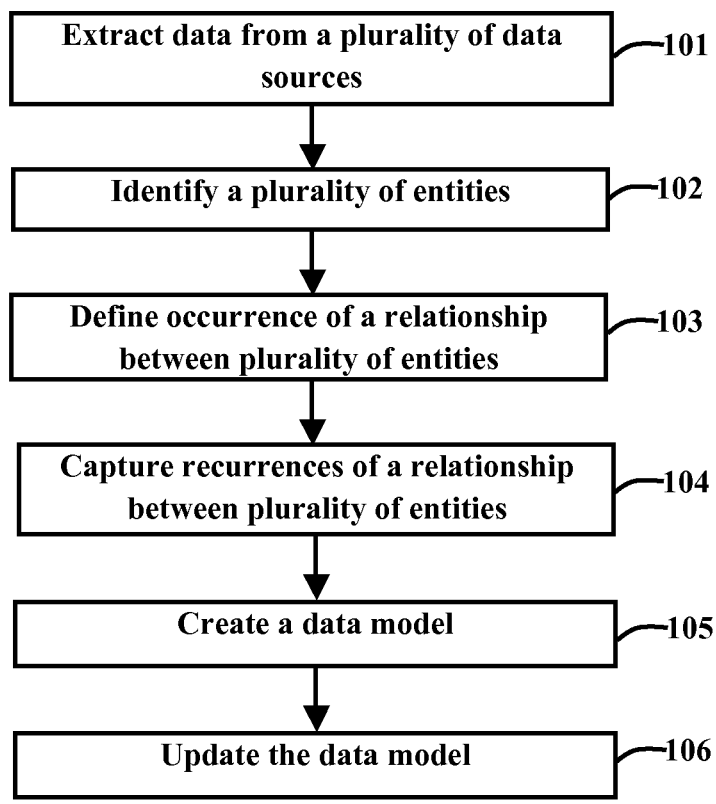
FIG. 1 is a flow diagram illustrating a method of modeling data, according to an embodiment of the present disclosure.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method and system for modeling a data. The method for modeling data comprises steps of extracting the data from a plurality of data sources, identifying a plurality of entities from the plurality of data sources, defining occurrence of a relationship between the plurality of entities, capturing recurrences of the relationship between the plurality of entities based on one or more common interactions between the plurality of entities and creating a data model indicating the occurrences and recurrences of the relationship between the plurality of the entities. The data model is adapted to store data corresponding to the plurality of entities, the relationship between the plurality of entities and the common interactions between the plurality of entities.

The method for modeling the data further comprises updating the data model automatically in response to a modification in context information or an operation history which is associated with at least one of the plurality of entities.

The method for modeling the data further comprises qualifying the occurrence of the relationship between the pluralities of entities based on a time frame.

The method for modeling the data further comprises defining one or more entities associated with the plurality of entities based on independent existence of the data across the plurality of entities.

Each of the plurality of the entities is connected to other entity by a relationship.

The step of capturing the recurrence of the relationship comprises steps of identifying the data based on a history of one or more interactions between the plurality of entities, detecting one or more entities which are commonly found with respect to recurrence of relationship and ascertaining the relevancy of the data by evaluating multiple occurrence of the relationship between the plurality of entities.

The plurality of data sources comprises at least one of emails, wikis, blogs, document management systems, database management systems, data warehouses and a plurality of public domain data sources. The data sources further include structured data sources such as databases, semi-structured data sources and unstructured data sources such as emails.

The plurality of entities includes at least one of a people, a document and a data where the plurality of entities is of a type including at least one of a known entity and a derived entity. Here the strength of the plurality of entities is determined based on an identification of a credibility of the data sources.

The system for modeling a data comprises a data extractor module to extract the data from a plurality of data sources, an entity extractor to define a plurality of entities, a relationship identifier to identify occurrence of a relationship between the plurality of entities and to evaluate recurrences of the relationship between the plurality of the entities and a data model generator for creating a data model. The data model stores a data corresponding to the plurality of entities, occurrence of the relationship between the plurality of entities and recurrences of the relationships between the plurality of entities based on one or more common interactions between the plurality of entities.

The system for modeling a data further comprises a datastore implemented using one or more data structures. The data structures are adapted to interact with each other for optimization of the data.

The relationship identifier is adapted to evolve the relationships between the plurality of entities based on at least one strength, context and frequency of the common interactions between the plurality of entities over a time frame.

The entity extractor is adapted to automatically extract a document metadata from a plurality of text structured; semi-structured and unstructured text documents and extract structured information from a plurality of unstructured machine readable documents and semi-structured machine readable documents.

The relationship identifier includes one or more machine learning algorithms, inference engines, or semantic aggregators to evaluate occurrence and recurrence of relationships between the plurality of the entities.

The data model is adapted to be programmed through an application programming interface to employ a user defined data logic.

FIG. 1 is a flow diagram illustrating a method of modeling data according to an embodiment of the present disclosure. The method comprising steps of extracting the data from a plurality of data sources (101). The various data sources from which the data is extracted include structured data sources such as databases, semi-structured data sources and unstructured data sources such as emails, document management systems, wikis, blogs, and public domain data sources such as social networks and the like. The method further comprising identifying a plurality of entities from the plurality of data sources (102), defining occurrence of a relationship between the plurality of entities (103), capturing recurrences of the relationship between the plurality of entities based on one or more common interactions between the plurality of entities (104).

The method herein adapts a classic conceptual modeling approach such as entity relationships for understanding the data. The modeling approach is conceptually similar to that of a URI-RDF (Unique Resource Identifier of Resource Description Framework) approach for understanding the data. The conceptual modeling approach defines an entity as a thing which is recognized as being capable of an independent existence and which can be uniquely identified. An entity is an abstraction from the complexities of certain domain. The method captures relationship between the entities with a single notional operation, for instance "is related to".

The method further comprises creating a data model indicating the occurrences and recurrences of the relationship between the plurality of the entities (105). The data model is adapted to store data corresponding to the plurality of entities, the relationship between the plurality of entities and the common interactions between the plurality of entities. The relationship defines how two or more entities are related to one another. Further these relationships are qualified by properties detected in common with the entities. Both the entities and relationships can have properties. The properties of relationships detected are then qualified based on the strength and time. The entities herein can be defined as people, documents, and data which are described in relation to each other. The plurality of entities is of a type including at least one of a known entity and a derived entity. The strength of the plurality of entities is determined based on an identification of a credibility of the data sources.

The method for modeling the data further comprises updating the data model automatically in response to a modification in context information or an operation history which is associated with at least one of the plurality of entities (106).

Figure 2:
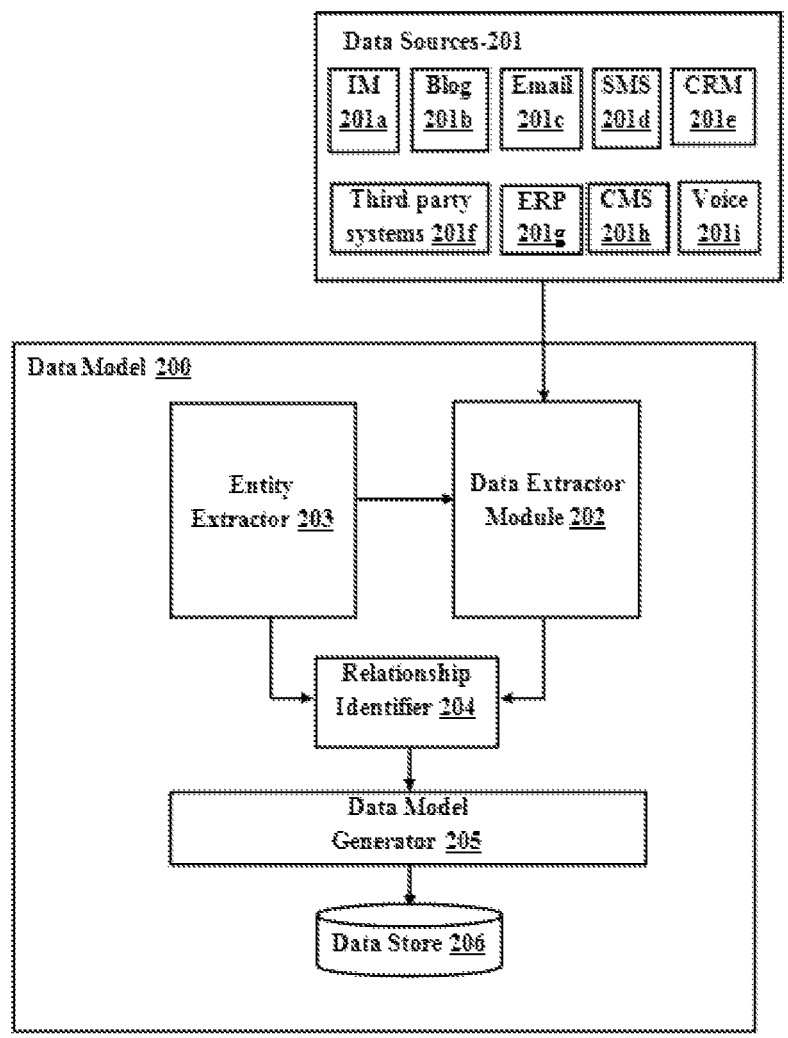
FIG. 2 is a functional block diagram illustrating a system for modeling data, according to an embodiment of the present disclosure.

FIG. 2 is a functional block diagram illustrating a system for modeling a data according to an embodiment of the present disclosure. The system comprises a data extractor module 202 to extract the data from a plurality of data sources 201. The data sources 201 comprises, but not limited to, an instant messenger 201*a*, blogs 201*b*, electronic mail 201*c*, messages 201*d*, third party systems 201*e*, ERPs 201*f*, CMS 201*g*, CRM 201*h*, voice messenger 201*i* and the like. The instant messenger, electronic mail and short message service are connected through a communication gateway to the data extractor module 202. In case of a voice input, the voice is passed through a voice to text converter component and further the converted text is extracted by the data extractor module 202.

The system further comprises an entity extractor 203 to define a plurality of entities from the plurality of data sources 201, a relationship identifier 204 to identify occurrence of a relationship between the plurality of entities and to evaluate recurrences of the relationship between the plurality of the entities and a data model generator 205 for creating a data model 200. The plurality of entities can be at least one of people, document or data.

The entity extractor 203 which automatically extracts document metadata from unstructured text documents. The entity extractor 203 automatically extracts key entities such as the names of persons, organizations, locations, expressions of times, quantities, monetary values, percentages, specialized terms, product terminology etc. The entity extractor 203 automatically extracts structured information from unstructured and/or semi-structured machine-readable documents.

The relationship identifier 204 is adapted to evolve the relationships between the plurality of entities based on at least one of strength, a context and a frequency of the common interactions between the pluralities of entities over a time frame. The relationship identifier 204 includes one or more machine learning algorithms to evaluate occurrence and recurrences of relationships between the plurality of the entities. The machine learning algorithm herein allows the system to self-learn naturally existing relationships between the entities and the different properties associated with the entities and evolve them based on the strength, time and frequency of use of their context(s). The credibility of the data source is also used as a factor in determining the strength of a relationship in relation to an entity.

The words extracted by the data extractor 202 from different data sources 201 and the information regarding the people and documents extracted by the entity extractor 203 is provided as an input to an data model generator 205 to generate the data model 200.

The system herein further comprising a datastore 206 comprising of a data stored according to one or more data models. The data store 206 is comprised of a file system, graph database, key value store, RDBMS and the like which is transparent to the consumer of the data model 200. Each customer will be provided with an API to access the data model 200. The data model 200 is a unified platform where all the discovered and classified entities are stored in appropriate data stores.

The data model 200 stores data corresponding to the plurality of entities, occurrence of the relationship between the plurality of entities and recurrences of the relationships between the plurality of entities based on one or more common interactions between the plurality of entities. The one or more data models are adapted to interact with each other for optimization of the data stored in each of the data model. The data model 200 is adapted to be programmed through an application programming interface to employ a user defined data logic.

The system herein employs a classic conceptual method of extracting relationship for understanding the data. This approach defines an entity as a thing which is recognized as being capable of having an independent existence and which can be uniquely identified. An entity is an abstraction from the complexities of certain domain. The relationship captures how two or more entities are related to one another.

The system constantly evaluates the nature of relationships between entities and how the relationships are strengthening and weakening with time.

The system herein employs an conceptual model similar to that of URI-RDF approach for data optimization. The entity extractor 203 defines the URIs as entities. The relationship identifier 203 learns the relationship between the entities.

The relationship identifier 204 employs one or more machine learning algorithms, inference engines, or semantic aggregators to understand the relationship existing between the entities and evolve the entities based on the strength and time of usage of the contexts.

According to an embodiment herein, the data model enables a user to employ data logic according to their requirements. As the data model does not contain the logic required by a third party application, the data logic need to be brought by the third party using the given Application Programming Interface (API). On providing the API to the data model, the data model provides the matching data back to the third party user.

According to an embodiment herein, the plurality of entities is mapped against each other based on the relationship between them. The relationship between the plurality of entities are evaluated based on the common interactions between the plurality of entities. The data model constantly evaluates the occurrence and recurrence of the same relationship between various entities and how the relationships are strengthening and weakening with time. The data model and machine learning algorithms herein allows the system to self-learn naturally existing relationships between the entities and the different properties associated with the entities and evolve them based on the strength, time and frequency of use of their context(s). The credibility of the data source is also used as a factor in determining the strength of a property in relation to entity.

The data model captures relationships between entities with a single, notional operator, for instance, {is RelatedTo}. For example, the relationship between two entities is defined as:

[Joe Biden]—{is related to}—[USA].

The relationship is then qualified by further entities detected in common with the entities. The relationship identifier then realizes the given example as:

| Citizen | Senator | VP |

[Joe Biden]----{is related to}----[USA].

The relationship identifier further qualifies the relationship based on the strength and frequency of usage of the entities.

| Strength | Time |
| Citizen | Senator | VP |

[Joe Biden]----{is related to}----[USA].

Each relationship has a "time of relationship creation" and "time of relationship detection" parameters associated. The relationship identifier allows the data model to constantly evaluate the nature of relationships between entities and how the relationships are strengthening and weakening with time.

The system considers the digital data artifacts and information (words) as entities which are described in relation to each other. Here the digital artifacts can be documents in any form such as whitepapers, proposals, pricing documents, presentations, purchase orders and invoices, resumes, audio or video clippings, mails, etc. Every object contained within a digital data artifact such as paragraphs in a document, sentences in a paragraph, words in a sentence, names of people, rows and columns in a database forms an entity by itself. The relationship between entities is described reciprocally in relation to the other. In the given example, the entity relationship is to be understood as:

[ Joe Biden ] [ Al Gore ] [ Dick ]

[VP]----{is related to}----[Government]

The data modeling system extracts and models information from any data sources made available to the system. The data modeling system thus accesses data from emails, document management systems, databases, data warehouses, wikis, blogs or even public domain sources such as social networks. The data modeling system unites and synthesizes data from various sources to weave a data model where various entities and their relationship with each other are defined. The data modeling system maps the information assets in the model and learns the words associated with each. This mapping is done periodically and from every new interaction of an information asset, the associated words are updated.

The credibility of the data source is taken as a factor in determining the strength of an attribute in relation to entities. For example, the data sourced from blogs may be accorded lower weight than that sourced from an enterprise database. The credibility of data is also associated based on time, based on authenticity of data sources, frequency of occurrence, duration of word associations, the relationship of other people associated, etc. The credibility of data sources is not predetermined or hard-coded but evolved bottom-up based on the system clearing a large number of test cases. This approach is not biasing the system in any way but allowing the system to learn the environment on its own terms which makes the system extremely rugged and flexible.

The embodiment described herein provides a platform adapted to host a variety of applications which can provide the semantic richness of the existing technique, at a much cheaper cost. The semantic applications can employ the proposed system for modeling data. The embodiment described herein separates the data logic from the data structure, thereby effectively making it easy for semantic applications to be built on it. The semantic applications can be built with minimal effort and negligible cost.

The embodiment described herein provides a method and system to model the most contextually relevant, real time, personalized and actionable data. For example, when the system is used in a healthcare environment where among other data sources, patient records are also available, the system constructs a comprehensive data model which can be used for semantic information retrieval.

The foregoing description of the specific embodiments herein will so fully reveal the general nature of the embodiments herein that others can, by applying current knowledge, readily modify and/or adapt for various applications such specific embodiments herein without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for modeling data, the method comprises:
    extracting a plurality of data from a plurality of data sources;
    identifying a plurality of entities from the plurality of data;
    defining occurrence of a relationship between the plurality of the entities;
    capturing recurrences of the relationship between the plurality of entities based on one or more common interactions between the plurality of entities, and wherein capturing recurrences of the relationship comprises identifying a data based on a history of one or more interactions between the plurality of entities, detecting one or more entities which are commonly found with respect to captured recurrence of relationship and ascertaining a relevancy of the data by evaluating multiple occurrences of the relationship between the plurality of entities, and wherein the relationship between the plurality of entities is captured with a single notational operation 'is related to'; and
    creating a data model indicating the occurrences and recurrences of the relationship between the plurality of the entities;
    wherein the data model is adapted to store the data corresponding to the plurality of entities, the relationship between the plurality of entities and the common interactions between the plurality of entities, and wherein the data model extracts and models information from any one the plurality of data sources that are made available to a system, and wherein the data model unites and synthesizes the data from the plurality of data sources to weave a data model in which the plurality of entities and a relationship with the plurality of entities are defined, and wherein the data model is a unified platform for storing all extracted and classified entities in data stores;
    wherein an optimization of the data stored in each of the data model is performed using a Unique Resource Identifier of Resource Description Framework (URI-RDF) approach.

2. The method of claim 1 further comprises updating the data model automatically in response to a modification in a context information or an operation history which is associated with at least one of the plurality of entities.

3. The method of claim 1 further comprises qualifying the occurrence of the relationship between the pluralities of entities based on a time frame and a strength, wherein the strength of the plurality of entities is determined based on an identification of a credibility of the plurality of data sources.

4. The method of claim 1 further comprises defining one or more entities associated with the plurality of entities based on an independent existence of the data across the plurality of entities and which is uniquely identified.

5. The method of claim 1, wherein each of the plurality of the entities is connected to other entity by a relationship, and wherein each relationship functions as an entity and wherein the relationship between the plurality of entities is described reciprocally in relation to the other.

6. The method of claim 1, wherein the plurality of data sources comprises at least one of emails, document management systems, database management systems, data warehouses and a plurality of public domain data sources, and wherein the plurality of data sources include structured data sources, semi-structured data sources and unstructured data sources, and wherein structured data sources include databases, and wherein unstructured data sources include emails.

7. The method of claim 1, wherein the plurality of entities includes contents of a digital data artifact, and wherein the digital data artifact includes people, documents, and data which are described in relation to each other, and wherein an object in the digital artifact is an entity, and wherein the object includes paragraphs in a document, sentences in a paragraph, words in a sentence, names of people, rows and columns in a database.

8. The method of claim 1, wherein the plurality of entities is of a type including at least one of a known entity and a derived entity.

9. A computer-implemented system for modeling data, the system comprising:
a data store;
a data extractor module configured to extract a plurality the data from a plurality of data sources;
an entity extractor module configured to define a plurality of entities a plurality of data sources;
a relationship identifier module configured to identify an occurrence of a relationship between the plurality of entities and to evaluate recurrences of the relationship between the plurality of the entities, wherein the relationship identifier module further configured to evolve the relationships between the plurality of entities based on at least one of strength, a context and a frequency of common interactions between a plurality of entities over a time frame, and wherein the relationship identifier module employs at least one of a machine learning algorithm, an inference engine, or a semantic aggregator to evaluate the relationship existing between the plurality of entities and evolve the plurality of entities based on the strength and a time of usage of the contexts; and
a data model generator configured to create a data model from a plurality of words extracted by the data extractor module from the plurality of data sources and the information regarding people and documents extracted by the entity extractor, wherein the data model generator further configured to understand naturally existing relationships between the plurality of entities and a plurality of properties associated with the entities, wherein the data model generator further configured to evolve the plurality of entities based on a strength, a time and a frequency of use of a context;
wherein the data model extracts and models information from any data sources that are made available to a system, and wherein the data model unites and synthesizes data from the plurality of data sources to weave a data model in which the plurality of entities and a relationship with the plurality of entities are defined, and wherein the data model is configured to store a data corresponding to the plurality of entities, occurrence of the relationship between the plurality of entities and recurrences of the relationships between the plurality of entities based on one or more common interactions between the plurality of entities, and wherein the data model is a unified platform for storing all extracted and classified entities in data stores, and wherein the data stored is optimized by interacting by interacting with a plurality of data models using a URI-RDF (Unique Resource Identifier of Resource Description Framework).

10. The system of claim 9, further comprising a data store implemented using one or more data structures, wherein then data structures are adapted to interact with each other for optimization of the data, and wherein the data store comprises a file system, a graph database, a key value store, and an RDBMS which is transparent to the user of the data model.

11. The system of claim 9, wherein the entity extractor is adapted to automatically extract a document data and a metadata from a plurality of structured, semi-structured and unstructured text documents, and wherein the entity extractor is adapted to extract a structured information from a plurality of unstructured machine readable documents and semi-structured machine readable documents, and wherein the metadata includes syntactic and semantic data.

12. The system of claim 9, wherein the relationship identifier includes a one or more machine learning algorithms to evaluate occurrence and recurrences of relationships between the plurality of the entities.

13. The system of claim 9, wherein the data model is adapted to be programmed through an application programming interface to employ a user defined data logic.

* * * * *